S. OTIS.

DUMP CAR.

APPLICATION FILED JUNE 2, 1907.

Reissued June 24, 1913.

13,582.

4 SHEETS—SHEET 1.

Witnesses:
E. S. G. Lyford
Chas. H. Bull

Inventor:
Spencer Otis,
By Sheridan & Wickinson,
Attys.

S. OTIS.

DUMP CAR.

APPLICATION FILED JUNE 8, 1907.

Reissued June 24, 1913.

13,582.

4 SHEETS—SHEET 2.

Witnesses:
Chas. E. Tuybl.
Chas. H. Buell

Inventor:
Spencer Otis,
By Sheridan & Wickinson,
Att'ys.

S. OTIS.

DUMP CAR.

APPLICATION FILED JUNE 8, 1907.

Reissued June 24, 1913.

13,582.

4 SHEETS—SHEET 3.

Witnesses:
Geo. E. Shepherd
Chas. H. Buell

Inventor,
Spencer Otis,
By Sheridan & Dickinson
Atty.

S. OTIS.

DUMP CAR.

APPLICATION FILED JUNE 8, 1907.

Reissued June 24, 1913.

13,582.

4 SHEETS—SHEET 4.

Witnesses:
Chas. E. Taylor.
Chas. H. Buell.

Inventor:
Spencer Otis,
By Sheridan & Dickinson
Att'ys.

UNITED STATES PATENT OFFICE.

SPENCER OTIS, OF CHICAGO, ILLINOIS, ASSIGNOR, BY MESNE ASSIGNMENTS, TO NATIONAL DUMP CAR COMPANY, A CORPORATION OF MAINE.

DUMP-CAR.

13,582. Specification of Reissued Letters Patent. Reissued June 24, 1913.

Original No. 780,759, dated January 24, 1905, Serial No. 162,002. Application for reissue filed June 8, 1907. Serial No. 378,045.

*To all whom it may concern:*

Be it known that I, SPENCER OTIS, a citizen of the United States, residing at Chicago, in the county of Cook and State of Illinois, have invented certain new and useful Improvements in Dump-Cars, of which the following is a specification.

This invention relates to that class of freight cars having a supporting frame portion with upwardly extending side and end boards; and it relates more particularly to the parts which go to form a drop bottom portion therefor with means for opening and closing such drop bottom portion, as will more fully hereinafter appear.

The principal object of this invention is to provide an efficient drop bottom dump car with simple mechanism for opening and closing the same.

Other objects of the invention will appear from an examination of the drawings and the following description and claims.

The invention consists principally in a car of this type in which there are combined a supporting frame portion, a drop bottom portion therefor formed of a plurality of swinging sections pivotally secured thereto at each side of the longitudinal center of the car, a movable bar for and in engagement with each of said swinging sections, and means reciprocating said bar mechanism to open and close said sections, substantially as described.

The invention consists, further, in the features, combinations and details of construction hereinafter described and claimed.

Figure 1:
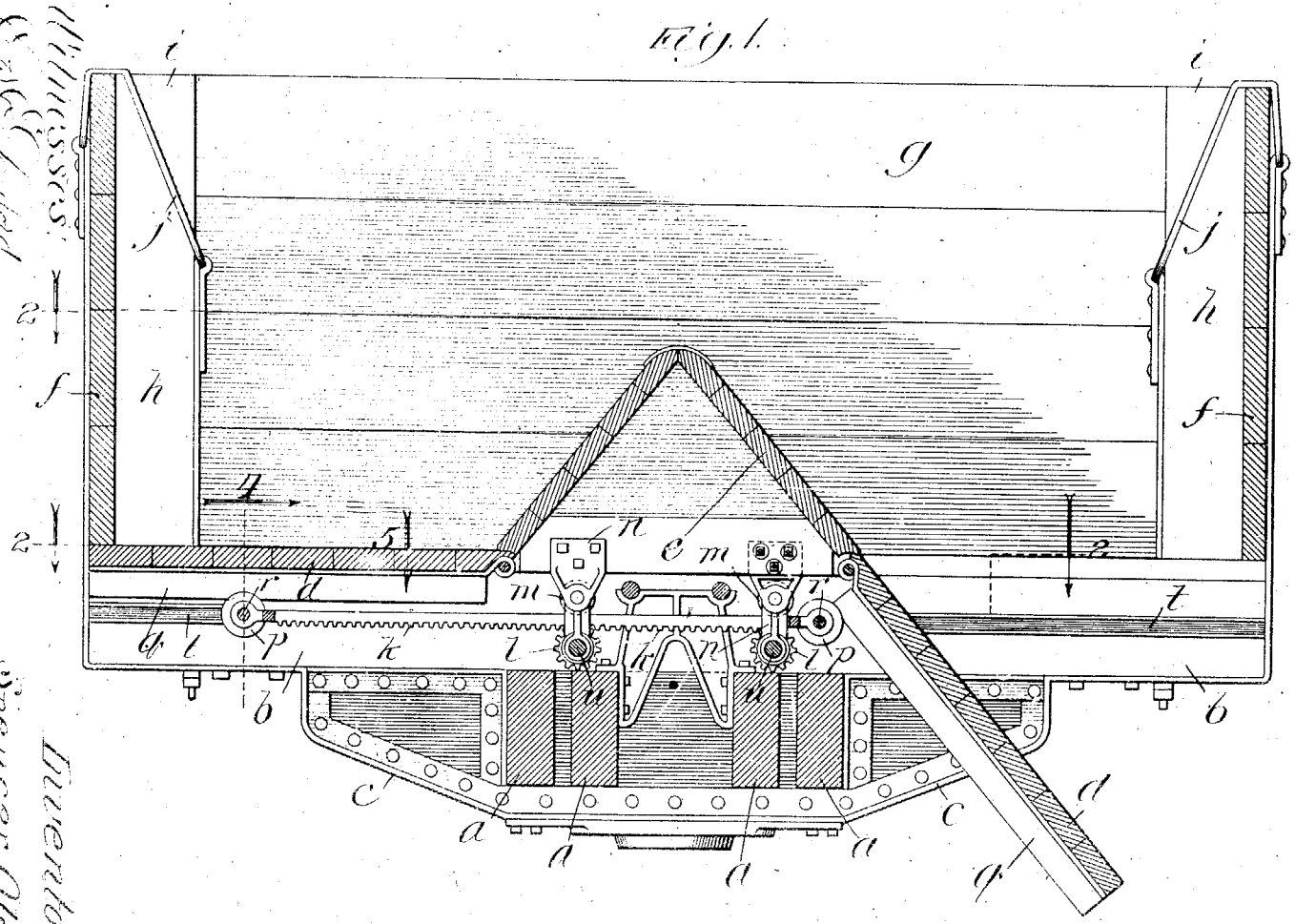
Figure 2:
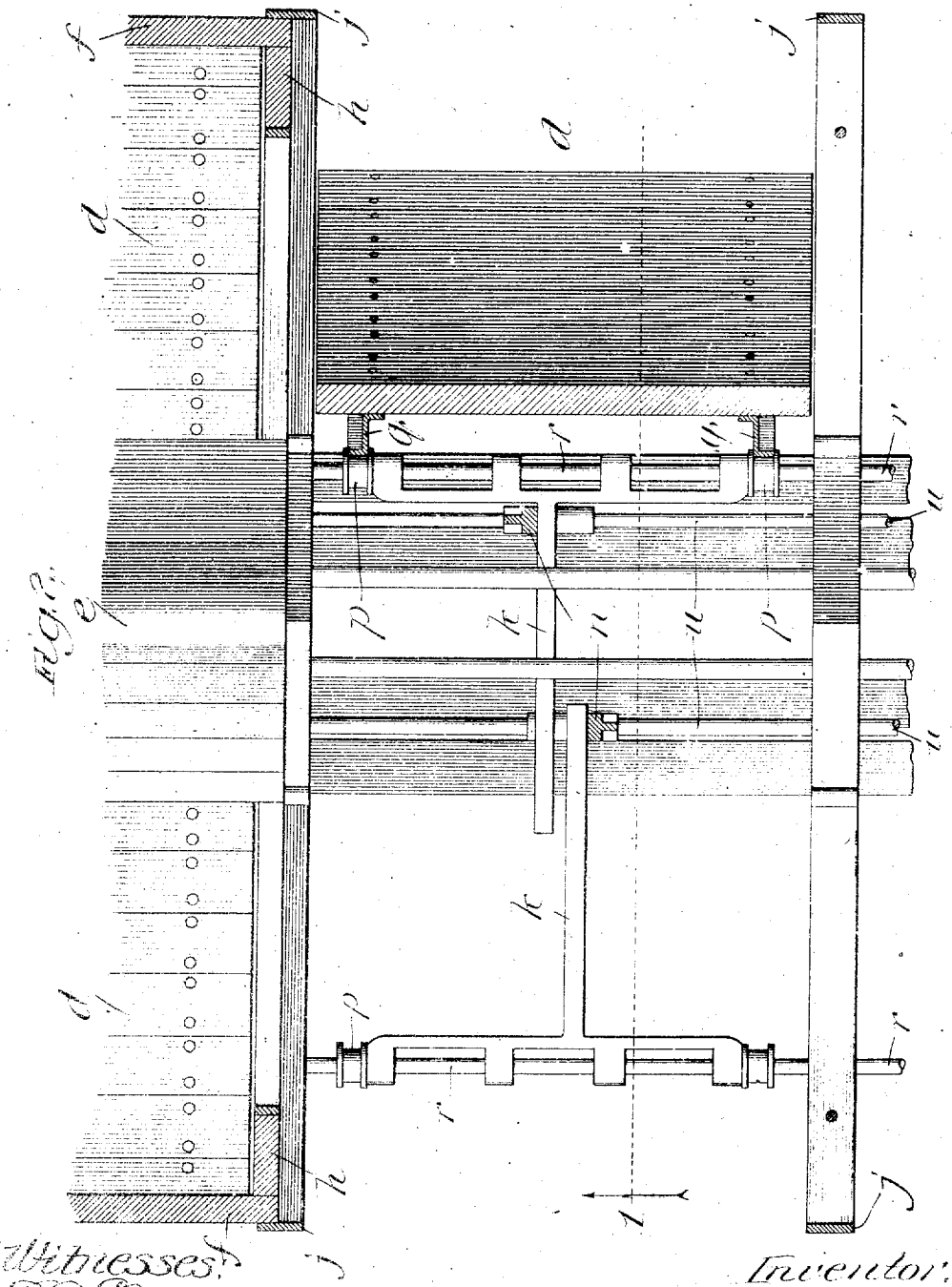
Figure 3:
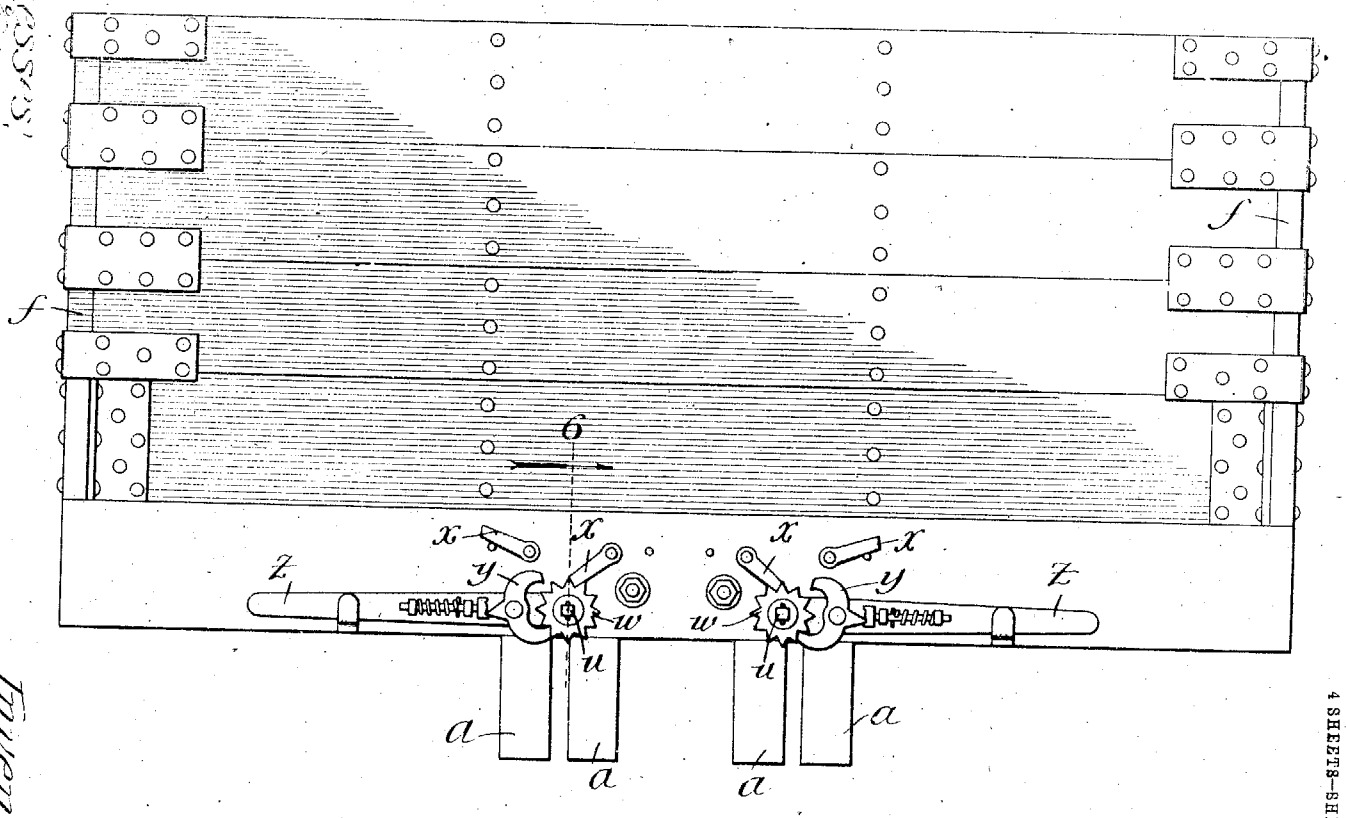
Figure 4:
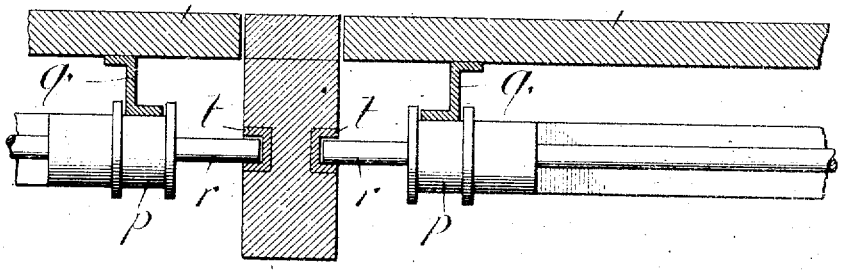
Figure 5:
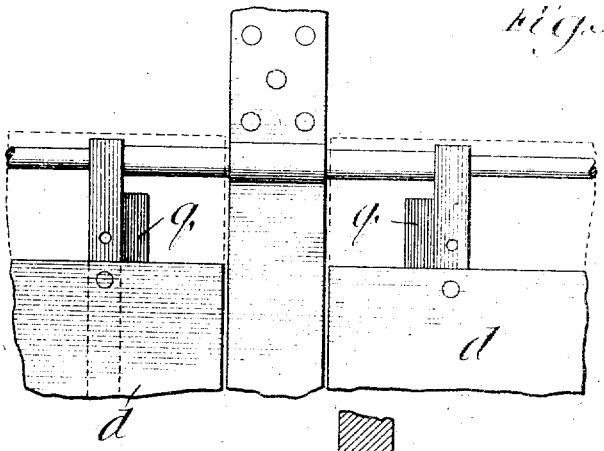

In the accompanying drawings—Figure 1 is a vertical cross sectional elevation of one type of car as it appears when constructed in accordance with these improvements; Fig. 2, a plan detail taken on the irregular lines 2, 2, and 2 of Fig. 1; Fig. 3, an end elevation of an end of the car; Fig. 4, a parti-sectional elevation taken on line 4 of Fig. 1; Fig. 5, a plan detail taken on line 5 of Fig. 1; and Fig. 6 a sectional detail in elevation, taken on line 6 of Fig. 3.

In illustrating and describing these improvements I have chosen a preferred type of car—namely, a dump car—to disclose the same and have only illustrated and will here describe that which I consider to be new taken in connection with so much that is old as will properly disclose the invention to others and enable those skilled in the art to practice the same, leaving out of consideration other and well-known elements, which if set forth herein would only tend to confusion, prolixity, and ambiguity.

In constructing a car in accordance with these improvements I make a supporting framework having a plurality of center sills *a* extending longitudinally of the car from end to end and on which are laid a plurality of transverse deck beams *b*, which extend entirely across the car from side to side. This structure dispenses with the usual draft-timbers and provides for a car which may be made lower than the usual type of car. A body bolster *c* may be provided, as shown in Fig. 1, extending out from and underneath both center sills and transverse deck beams.

To form a drop bottom for this type of car, a plurality of swinging sections *d* is provided and pivotally secured to the supporting framework of the car at their inner edges and at each side of the longitudinal center, which in connection with the central apex portion *e* serves to discharge a load of bulky freight whenever occasion requires.

The drawings show the superstructure of the car as provided with side boards *f* and end boards *g*, held in position by means of the side stakes *h* and end posts *i*, and may or may not be provided with the straps *j*, as required by different circumstances and conditions. To open and close the drop bottom portion whenever desirable or necessary, a plurality of rack bars *k* is provided and supported partially upon the pinion mechanism *l* and between such mechanism and idler rolls *m*, both of which parts are rotatably mounted in brackets *n*, that are secured to the supporting framework of the car. The forward part of these rack bars is provided at or near each lateral edge with antifriction wheels which engage with metallic Z-bars *q* on the under side of each swinging section, so that as the rack bars are reciprocated the antifriction rolls bearing against the Z-bar tracks of the swinging sections will act to close such swinging sections, as shown to the left of Fig. 1, or permit them to be opened, as shown to the right of such figure. To support such rack bars and doors in position, the forward portions are preferably provided with shafts or rods *r*, though they may be formed or cast integral with said rack bars, so that the lateral edges of said bars or the ends of the rods engage with supporting tracks *t*, arranged in the side faces of the transverse deck beams, all of which, as above suggested, acts to support the doors and forward part of the reciprocating rack bars.

Figure 6:
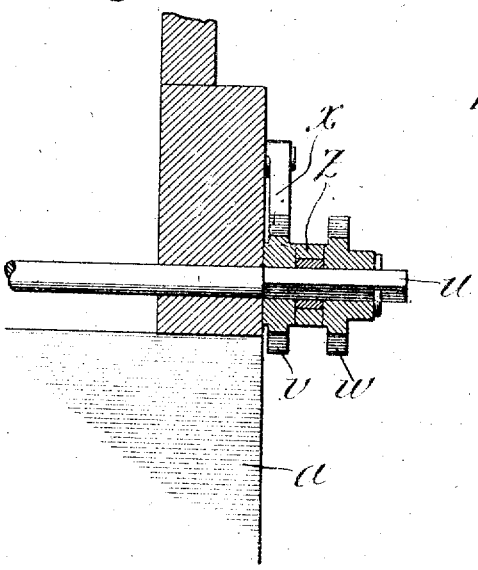

The pinions which reciprocate the rack bars are mounted upon shafts *u*, the ends of which project from the end sills of the car, as shown particularly in Figs. 3 and 6, and are squared, as therein shown, to receive the end of a socket wrench or key by which such shafts and the spur pinions are rotated. The ends of these shafts are provided with star wheels *v* and *w*, with the first of which a pawl or pawls *x* may engage to permit the shafts to be rotated in either direction, while with the other a spring pressed click *y* of an operating lever *z* may engage, all of which permits the shafts to be wound or rotated in the desired direction to be held at any desired point.

I claim:

1. In a car of the class described, the combination of a supporting frame portion, a drop bottom therefor formed of a plurality of swinging sections pivotally secured thereto, a reciprocating rack bar for and in engagement with each swinging section, and pinion mechanism for reciprocating said rack bar and thereby opening and closing the swinging sections, substantially as described.

2. In a car of the class described, the combination of a supporting framework provided with a drop bottom formed of a plurality of swinging sections pivotally secured thereto at each side of the longitudinal center, a reciprocating rack bar having a bearing portion at each forward lateral edge in the framework of the car and contacting the under side of each swinging section, and pinion mechanism for reciprocating said bar, substantially as described.

3. In a car of the class described, the combination of a supporting framework provided with transverse beams, a drop bottom therefor formed of a plurality of swinging sections pivotally secured to the framework at each side of the longitudinal center, track mechanism supported in the supporting framework of the car, a movable rack bar having the forward lateral edges thereof running in the tracks on the supporting framework and contacting the under surface of each swinging section, and pinion mechanism for reciprocating said rack bars and thereby opening and closing the swinging sections, substantially as described.

4. In a car of the class described, the combination of a supporting framework provided with a plurality of transverse deck beams, a drop bottom portion formed of a plurality of swinging sections pivotally secured at their inner edges to the supporting framework at each side of the longitudinal center, a rack bar for each and every swinging section provided with projections at its forward lateral edges and antifriction rollers thereon contacting the under portion of each swinging section, pinion mechanism for each rack bar to reciprocate the same, and track mechanism on the deck beams engaging the forward lateral edges of the rack bar so as to keep the same in contact with the under portion of the swinging sections to open and close the same, substantially as described.

5. In a car of the class described, the combination of a supporting framework provided with a plurality of transverse deck beams, a drop bottom for such car formed of a plurality of swinging sections pivotally secured to the supporting framework between the deck beams and at each side of the longitudinal center of the car, track mechanism on the under surface of each swinging section, a rack bar movably mounted in the supporting framework of the car and provided at its forward portion with antifriction wheels engaging the tracks on the under surface of the swinging sections, and pinion mechanism for reciprocating such racks to open and close the swinging sections, substantially as described.

6. In a car of the class described, the combination of a supporting framework provided with a plurality of transverse deck beams, a drop bottom for such car formed of a plurality of swinging sections pivotally secured to the supporting framework between the deck beams and at each side of the longitudinal center of the car, track mechanism on the under surface of each swinging section, a rack bar movably mounted in the supporting framework of the car and provided at its forward portion with antifriction wheels engaging the tracks on the under surface of the swinging sections, pinion mechanism for reciprocating such racks to open and close the swinging sections, roll mechanism between which and the pinion mechanism the rack bars are movably mounted and held in position, and track mechanism secured to the transverse deck beams for holding the forward portion of the rack bars in operative position, substantially as described.

7. In a car of the class described, the combination of a supporting framework formed of a plurality of longitudinal center sills, a plurality of transverse deck beams laid on the center sills and extending entirely across the car, floorwork arranged at the upper part of the transverse deck beams, a plurality of doors forming the dumping bottom of such car, bodily movable shafts for supporting and operating said doors, and means for operating said reciprocating members, substantially as described.

8. In a car of the class described, the combination of a plurality of center sills extending continuously from end to end of the car, a plurality of deck beams laid thereon extending continuously across the car from side to side, a floor portion at the upper part of the deck beams, side frames mounted upon the outer ends of and supported by such deck beams, a dumping bottom portion formed of a plurality of swinging sections, bodily movable shafts for supporting and operating said doors, and means for operating said reciprocating members, substantially as described.

9. In a car of the class described, the combination of a supporting framework provided with a plurality of center sills extending longitudinally of the car from end to end, a plurality of transverse deck beams laid on the upper part of such center sill and extending entirely across the car from side to side thereof, a drop bottom or floor portion formed of a plurality of swinging sections pivotally secured to the supporting framework of the car at each side of the longitudinal center and at or near the upper part of and between the transverse deck beams, metal bars secured to the under side of each swinging section so as to form track mechanism, rack bars reciprocatingly mounted in the supporting framework of the car and provided with antifriction roll mechanism engaging the tracks of the swinging sections, pinion mechanism for reciprocating such rack bars, and track mechanism secured to the side faces of the transverse deck beams to hold the forward portion of the rack bars and thereby the antifriction rolls in operative engagement with the swinging sections, substantially as described.

10. In a car of the class described, the combination with a supporting framework comprising longitudinal central supporting means, of transverse members laid on the longitudinal supporting means and extending entirely across the car, a floor comprising longitudinally arranged dumping doors, bodily movable shafts for supporting and operating said doors, and means for operating said reciprocating members, substantially as described.

11. A car of the class described having a floor comprising a series of dumping doors and reciprocating shaft for supporting and operating the doors, means for operating the shaft, and means for holding the shaft at any position to which it may be adjusted.

12. In a dump car, the combination of a car frame, a dumping door mounted therein movable to open and closed positions, a reciprocatory shaft for operating such door, pawl and ratchet mechanism connected with such shaft, a lever for operating the pawl and ratchet mechanism and thereby the shaft and door, and means for holding the shaft and thereby the door in different adjusted positions.

13. In a dump car, the combination with a car frame, of a dumping door mounted therein movable to open and closed positions, a bodily movable shaft for operating said door, mechanism comprising a pawl and ratchet operatively connected to said shaft for moving the same to open and close said door, a lever for operating the pawl and ratchet mechanism and thereby said shaft and door, and means for holding said shaft and thereby said door in different adjusted positions.

14. In a dump car, the combination with a car frame, of a dumping door mounted therein movable to open and closed positions, a reciprocatory shaft for operating such door, mechanism comprising a pawl and ratchet operatively connected to said shaft for reciprocating the same and thereby opening and closing said door, a lever for operating the pawl and ratchet mechanism and thereby the shaft and door, and means for locking said shaft in any position to which it is reciprocated and thereby holding said door in different adjusted positions.

15. In a dump car, the combination with a car frame, of a dumping door mounted therein movable to open and closed positions, a bodily movable shaft for operating such door, mechanism comprising a pawl and ratchet operatively connected to said shaft for bodily moving the same, a lever for operating the pawl and ratchet mechanism and thereby moving said shaft to open and close said door, and means for holding said shaft and thereby said door in different adjusted positions.

16. In a dump car, the combination with a car frame, of a dumping door mounted therein movable to open and closed positions, a bodily reciprocatory shaft for engaging said door to open and close the same, mechanism comprising a pawl and ratchet operatively connected to said shaft for bodily reciprocating the same, a lever for operating said pawl and ratchet mechanism and thereby bodily reciprocating said shaft, and means for locking said shaft and thereby said door in different adjusted positions.

17. In a dump car, a hinged door, a bodily movable shaft for supporting and operating said doors, and actuating means for said shaft comprising a rack and pinion, said rack being positioned above said pinion.

18. In a car of the class described, the combination of a support, a floor comprising hinged dumping doors, door operating and supporting shafts bodily movable on said support and engaging the under side of the doors, and racks and pinions for imparting bodily movement to said shafts, said racks being arranged above the axis of the pinions.

19. In a car of the class described, the combination of a support, a floor comprising hinged dumping doors, door operating and supporting shafts bodily movable on said support and engaging the under side of the doors, and racks and pinions for imparting bodily movement to said shafts, said racks being provided with downwardly directed teeth and said pinions being mounted below said racks.

20. In a car of the class described, the combination of a longitudinal central supporting means, transverse deck-beams supported thereby, a plurality of swinging floor sections pivotally attached thereto, a bodily movable shaft for operating said doors, a lever, pawl and ratchet mechanism connected with said lever, and means by which said pawl and ratchet mechanism may impart a bodily movement to said shaft.

21. In a car of the class described, the combination of longitudinal central supporting means, transverse deck-beams supported thereby, a plurality of swinging floor sections pivotally attached thereto, a bodily movable shaft for operating said doors, a rotatable shaft, pawl and ratchet mechanism associated with said rotatable shaft, a lever for operating said pawl and ratchet mechanism, and means by which said rotatable shaft may impart a bodily movement to said operating shaft.

22. In a car of the class described, the combination of a longitudinal central supporting framework, a plurality of transverse deck-beams laid on said supporting framework and extending entirely across the car, floorwork arranged at the upper part of the transverse deck-beams, a plurality of doors forming the dumping bottom portion of such car, bodily movable shafts for supporting and operating said doors, and means for operating said reciprocating members.

23. In a car of the class described, the combination of a longitudinal central supporting framework extending continuously from end to end of the car, a plurality of deck-beams laid thereon extending continuously across the car from side to side, a floor portion at the upper part of the deck-beams, side frames mounted upon the outer ends of and supported by such deck-beams, a dumping bottom portion formed of a plurality of swinging sections, bodily movable shafts for supporting and operating said doors, and means for operating said reciprocating members, substantially as described.

SPENCER OTIS.

Witnesses:
GEO. L. WILKINSON,
W. T. JONES.